United States Patent [19]

Hattemer

[11] Patent Number: 4,526,405
[45] Date of Patent: Jul. 2, 1985

[54] LABEL STRUCTURE

[75] Inventor: James C. Hattemer, Cincinnati, Ohio

[73] Assignee: Graphic Resources, Inc., Cincinnati, Ohio

[21] Appl. No.: 450,538

[22] Filed: Dec. 17, 1982

[51] Int. Cl.³ ............................................. B32B 7/06
[52] U.S. Cl. ..................................... 283/81; 428/40; 428/42; 428/77; 428/212; 40/2 R; 40/630
[58] Field of Search ...................... 156/90; 428/40-42, 428/77, 78, 212, 214, 192, 195; 40/2 R; 283/81, 80, 79

[56] References Cited

U.S. PATENT DOCUMENTS

| Re. 30,573 | 4/1981 | Ichinose et al. |
|---|---|---|
| 2,363,472 | 11/1944 | Ritter . |
| 2,783,172 | 2/1957 | Avery . |
| 2,931,557 | 4/1960 | Loderhose . |
| 3,148,820 | 9/1964 | Robbins, et al. . |
| 3,166,186 | 1/1965 | Karn . |
| 3,226,862 | 1/1966 | Gabruk . |
| 3,484,976 | 12/1969 | Shea . |
| 3,494,059 | 2/1970 | Minasian . |
| 3,522,136 | 7/1970 | Williams et al. . |
| 3,702,511 | 11/1972 | Miller . |
| 3,889,407 | 6/1975 | Elzer . |
| 3,947,983 | 4/1976 | Brunette . |
| 3,974,311 | 8/1976 | Cherrin . |
| 4,006,048 | 2/1977 | Cannady et al. ............... 156/90 |
| 4,068,028 | 1/1978 | Samonides . |
| 4,153,163 | 5/1979 | Alderman et al. . |
| 4,153,496 | 5/1979 | Swift . |
| 4,157,410 | 6/1979 | McClintock ................ 428/40 |
| 4,204,706 | 5/1980 | Blum et al. . |
| 4,219,596 | 8/1980 | Takemoto et al. . |
| 4,264,657 | 4/1981 | Tollette . |
| 4,269,321 | 5/1981 | Ichinose et al. . |
| 4,273,816 | 6/1981 | Tollette . |
| 4,273,827 | 6/1981 | Sweeney et al. ............. 156/90 X |
| 4,281,762 | 8/1981 | Hattemer . |
| 4,351,685 | 9/1982 | Clark . |
| 4,359,358 | 11/1982 | Hattemer . |
| 4,479,838 | 10/1984 | Dunsirn et al. . |

FOREIGN PATENT DOCUMENTS

| 53-5600 | 1/1978 | Japan . |
|---|---|---|
| 603780 | 8/1978 | Switzerland ............... 428/42 |
| 4602 | of 1895 | United Kingdom . |

OTHER PUBLICATIONS

MPI Label Systems, Brochure, "Now it Sticks".

Primary Examiner—Alexander S. Thomas
Attorney, Agent, or Firm—Wood, Herron & Evans

[57] ABSTRACT

A label structure includes a base sheet, a top sheet, and a barrier sheet therebetween for preventing ink or print media transfer between the top base sheets. The top sheet is removable in its entirety. Paper, clear and other base sheets are contemplated. A preferred method for manufacturing the label structure includes printing a top web, applying glue to both sides of a barrier web, joining the top web to the barrier and another side of the barrier to a base web and carrier web composite, die cutting top sheets, barrier sheets and base sheets from said respective webs, and on the carrier web, and thereafter rolling the carrier web with separate label structures thereon to form a rolled label supply.

15 Claims, 7 Drawing Figures

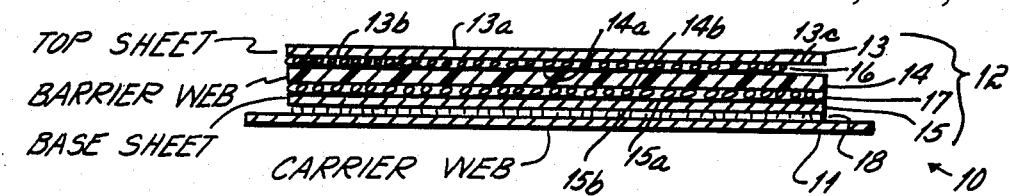
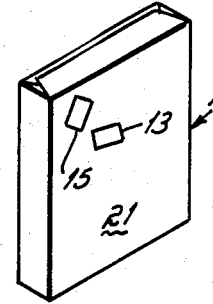
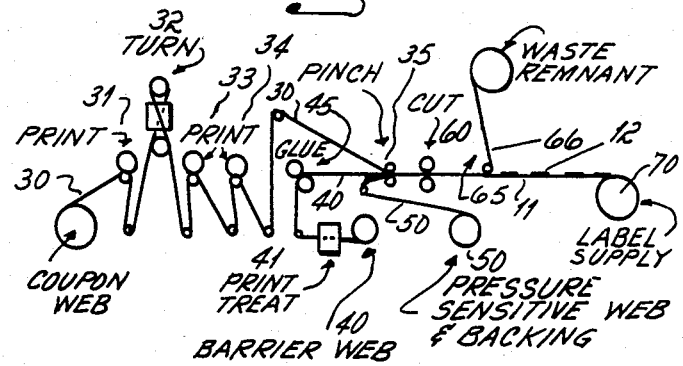
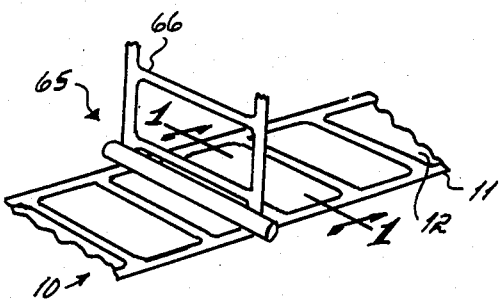
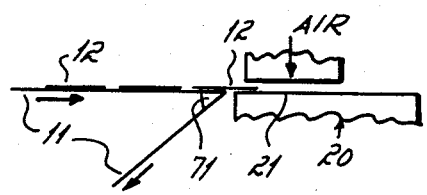
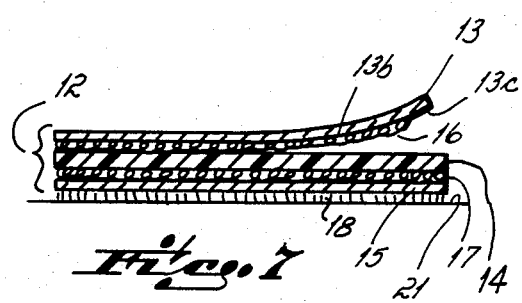
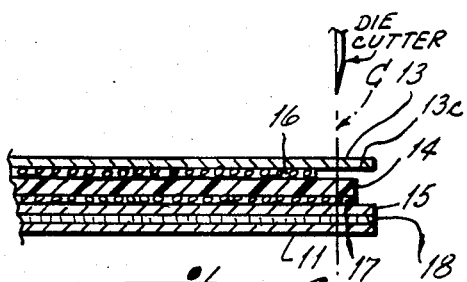

LABEL STRUCTURE

BACKGROUND OF THE INVENTION

This invention relates to coupons and labels and more particularly to composite coupons and labels and to manufacturing processes therefor.

My U.S. Pat. No. 4,281,762 discloses a composite in-store coupon having a top sheet and a base sheet wherein the top sheet has side portions permanently secured to the base sheet and a removable central coupon portion free of adherence to the base sheet. A central portion of the top sheet is detachable from the side portions and serves as a redemption, discount or promotional coupon, for example. This, of course, leaves the side portions with the base. Any copy or art work to stay on the removed coupon must be disposed within the confines of the removable center area.

Where it is desired to reduce the overall label structure size, a top sheet with no side portions is provided, and the copy or art work is printed thereon from one edge to another. Applicant has previously manufactured and sold a prior art label structure such as this, including a composite label having a removable top sheet which is adhesively, but removably, secured to a base sheet. The entire top sheet is removed from the base sheet and the top sheet does not retain any sticky adhesiveness or tackiness. Adhesives known in the industry as "fugitive" adhesives provide this removal function wherein no adhesive remains on the base. Such an adhesive is, for example, the adhesive sold as "EASY OFF" adhesive by Adhesive Products of New York, N.Y., under type production formula designation 1167-S2.

In manufacturing this structure, both sides of a top web are printed, the upper side of a pressure sensitive base web is printed, fugitive adhesive is applied, the webs are joined together, and thereafter the webs are die cut on a backing or liner web, all on the same equipment, to define individual labels, having top and base sheets, disposed on the backing web. This is similar to the manufacture of labels under the aforesaid patent, except that a fugitive adhesive is used and no perforations are cut to define side portions in the top sheets.

Such a procedure requires the use of a significant amount of adhesive; more so than would be used in other circumstances as will be explained. This use of excessive adhesive is believed to cause significant visual imperfections in the finished label, upon top sheet removal. These imperfections are believed to be due to the transfer of ink, or print media, between the top and base sheets, while the ink and the glue are still wet or viscous, spoiling the appearance of the receiving sheet.

More particularly, it is desirable to manufacture a label supply of composite labels on web fed printing apparatus running at speeds, for example, of 200–300 feet per minute. A top web is printed, for example, joined on the fly to a moving base web to which fugitive adhesive has been applied, and thereafter the top and base webs are die cut on the fly into individual labels. Due to the rapid movement of the two webs during joining and die cutting, it will be appreciated that it is difficult to maintain proper register between the webs, and between the top and base sheets during and after die cutting.

To insure proper register and orientation of the sheets, it has been found preferable to use a significant amount of the "fugitive" adhesive. Such adhesive, in its wet form, tends to hold the top and base sheets together during and after die cutting, and until the adhesive later cures. Use of excess amounts of such "fugitive" adhesive, while required for sheet orientation, is expensive.

It would be possible to use significantly less adhesive if the ultimate releasable securement of the sheets was the only goal, however, the manufacturing speeds and process require use of more adhesive than is otherwise required.

Normally, and apart from the added cost of the excess adhesive, its use would not present any problem. However, due to machine speed, and since at least the top web is printed immediately before joining to the base web by wet adhesive, the ink or other print media is still wet or damp when the top web is joined to the base web. It is believed that the wet or damp ink coalesces or otherwise transfers from the top sheet underside to the adhesive, and then to the base web, or remains with any small amount of adhesive which might be left with the base web when the top sheet is eventually removed as a coupon. Of course, a similar result is obtained when the base web is printed on the same press, and base web ink may transfer to the underside of the top sheet or removable coupon.

This transfer of ink or print media between webs or sheets is undesirable and occasionally spoils an otherwise acceptable print job. Any ink or other print media on the base is particularly distracting and detrimental.

SUMMARY OF THE INVENTION

Accordingly, it has been one objective of this invention to provide improved composite labels and coupons.

A further objective of this invention has been to provide an improved process for manufacturing a composite label supply.

A further objective of this invention has been to provide a composite label including a removable top sheet, printed on its under side, and a base sheet, all without ink or print media transfer between the sheets.

To these ends, a label according to a preferred embodiment of the present invention includes a pressure sensitive base sheet and a liner or backing, a top sheet, and a clear barrier sheet therebetween. Respective adhesive layers between the barrier sheet and the top sheet on one side, and between the barrier sheet and the base sheet on another side secure the composite structure together. Preferably, the underside of the top sheet is uncoated paper and the top side of the base sheet is coated paper. Under this condition, the top sheet can be removed while the clear barrier sheet sticks with the base. A small portion of the top sheet overlaps the adhesive securing the top sheet to the barrier to facilitate top sheet removal.

Also, and in this embodiment, it is no longer necessary to use a "fugitive" adhesive. A less specialized, general purpose and less costly adhesive can be used. Thus, and even though a relatively large amount of adhesive may be used to prevent the components from skewing during manufacture, the cost is not as great.

A label supply, according to a preferred embodiment of the invention, includes the aforementioned composite label and an elongated carrier backing, liner, or release web on which the labels are mounted by the pressure sensitive adhesive. After manufacture, the web is rolled into a roll to provide a rolled label supply.

In a preferred process of manufacturing the aforesaid labels, a top web is printed on one or both sides, glue is applied to both sides of a barrier web, and the top web and barrier web are joined with a base web and carrier web composite. Thereafter, separate labels are die cut to define composite label structures on the carrier web. In addition, of course, the base web can also be printed.

The barrier sheet inhibits transfer of any ink or other print media used, between the top and the base components of the label. The wet ink, even if it coalesces with the adhesive on either side of the barrier, cannot transfer through the barrier. Moreover, the glue between the top sheet and barrier, even though it is not a fugitive glue, all tends to remain with the top sheet when it is removed from the barrier, due to the use of uncoated paper, so that even if any ink coalesces into the glue, it simply remains therein over the area on the top sheet from which it came. It is thus not left on the barrier nor, of course, on the base.

It will be appreciated that the invention provides significant advantages. First, general purpose adhesive can be used and no special expensive glues are required between the top and the base sheet. Secondly, enough of the adhesive can be used to maintain register and orientation between the top and base sheets, but without undesirable ink transfer therebetween. Moreover, paper base sheets can be used with ease, and without undesirable ink transfer or spoiling.

These and other advantages will become readily apparent from the following detailed description of a preferred embodiment of the invention, and from the drawings, in which:

BRIEF DESCRIPTION OF THE DRAWINGS

FIG. 1 is a cross sectional view of a preferred embodiment of a label supply according to the invention, and is taken along lines 1—1 of FIG. 4;

FIG. 2 is a perspective view of a product with a composite label thereon and showing a top portion of the composite label having been removed;

FIG. 3 is a diagrammatic elevational view of an apparatus for making a rolled label supply according to the invention;

FIG. 4 is a perspective view of a web of the labels of FIG. 1, illustrating one portion of the label forming process;

FIG. 5 illustrates a typical label application operation;

FIG. 6 diagrammatically illustrates the intermediate composite web structure prior to die cutting into separate composite labels; and FIG. 7 illustrates the removal of a top sheet from a composite label structure according to the invention.

DESCRIPTION OF THE PREFERRED EMBODIMENT

Turning now to FIG. 1, a portion of a label supply according to the invention is shown in cross section. The rolled label supply 10 includes an elongated carrier, release liner, or backing web 11. Mounted on the web 11 is a preferred composite label structure 12 according to the invention. The composite label structure 12 includes a removable top sheet 13, a barrier sheet 14 and a base sheet 15. Layers of adhesive, 16 and 17, lie between the top sheet 13 and barrier sheet 14, and between the barrier sheet 14 and the base sheet 15, respectively. Also, a layer of pressure sensitive adhesive 18 is disposed between the base sheet 15 and the web 11.

It will be appreciated that the top sheet 13 has an upperside 13a and a lower or underside 13b. The barrier sheet has an upper or top side 14a and a lower or underside 14b. The base sheet 15 has an upper or top side 15a and a lower or bottom side 15b. As will be later described with reference to FIG. 7, top sheet 13 has a portion 13c, which may be a full edge portion or just a corner portion, overlapping first adhesive layer 16.

Turning now to FIG. 2, a label structure according to the invention is shown in use in connection with a product 20. A base sheet 15 is mounted on a surface 21 of the product by means of the pressure sensitive adhesive 18 (the composite label structure 12 having been removed from the liner web 11 and applied to the product 20).

As shown in FIG. 2, the top sheet 13 has been removed from the base sheet 15. This would occur at point of sale, for example, where a purchaser desires to use the top sheet 13 for the purposes of a redemption, discount, or the like, depending upon how the label structure is utilized in connection with the product.

It will be appreciated that the top sheet 13 is preferably the same size as the base sheet 15, and is preferably coextensive therewith. It will also be appreciated that the base sheet 15 remains with the product 20, while the top sheet 13 is removable therefrom.

Turning now to FIG. 3, there is shown in that figure a diagrammatic view illustrating the manufacture of a rolled label supply, according to the invention, on a single apparatus. The manufacturing operation and process is preferably conducted on a printing apparatus, known in the industry as a "Mark Andy", Model 2100, In-Line, Flexographic Printing, Die Cutting, and Laminating Press. Such apparatus is available from Mark Andy, Incorporated, 18081 Chesterfield Airport Road, Chesterfield, Mo. 63017. While any other suitable apparatus may be useful for forming the composite label structure of the invention, this apparatus is particularly useful as will be described.

Considering now the details of FIG. 3, a rolled, elongated, coupon or top web 30 is illustrated at the lefthand area of the figure. This coupon web includes material which will eventually define the top sheet 13 of the label composite 12.

This web is run through a print station 31 which prints one side of the web, turn station 32, which turns the web over in a well known manner, and additional print stations 33 and 34 which print opposite sides of the web. Accordingly, an underneath side of the web corresponding to the underneath side 13b of the top sheet 13 is printed at the first print station 31 while the top side of the web corresponding to surface 13a of the top sheet 13 is printed at stations 33 and 34. Thereafter, the web 30 is directed to a joining nip 35 where it is joined with the other materials of the invention as will be described.

It will be appreciated that the web 30 can be run through varying numbers of printing stations, and on any side, to produce desired multi-color printing on either or both sides of the web.

The barrier sheets 14 are initially provided in elongated web rolled form, as shown at web 40 in FIG. 3. Preferably, this web is slightly narrower than the top sheet web at this time, and later diecutting of the composite cuts all three webs into structures where top sheet, barrier and base sheet are generally coextensive. Alternately, the barrier sheet may be left slightly narrower than the top sheet in cut form. In either structure or process, a cleaner operation, with no tramp edge glue, is the result.

Preferably, the barrier material is purchased in rolled, elongated webs in pre-print treated condition. The print treating is believed to promote adhesion to the other webs. Such print treating operations are well known in the art and include electronic corona discharge, flame treatment or any other known treatment means.

Web 40 can be print treated on the press equipment of a print treating station 41 (FIG. 3) which subjects the web to a print treating operation.

The barrier web 40 comprises preferably a clear transparent film made from, for example, polypropylene, polyester, or acetate. For desired applications, the barrier could be translucent or opaque, instead of clear the transparent. Also, the barrier could be pre-printed.

The barrier web 40 is directed through a double side glue treatment station 45 where adhesive is rolled onto both sides of the barrier web in any suitable manner well known in the art. This glue station 45 is operable to apply a layer of adhesive to each side of the barrier web, and preferably, slightly inboard of the barrier edges, and at least along one edge thereof (FIG. 6). Also, layer 16 is preferably slightly narrower than layer 17, at least along one longitudinal edge so as to provide a non-adhered top sheet portion as will be described. Such adhesive, according to the invention, can be any suitable, general purpose adhesive. Preferably, an adhesive such as Adhesive No. 1533X, sold by Fuller Adhesives of Minneapolis, Minn., is utilized in a preferred embodiment of the invention. From the glue station 45, the barrier web 40 is directed to the nip 35 for joining with other components of the label structure.

An elongated base web, which will ultimately correspond to the pressure sensitive base sheet 15 is provided, together with the elongated release liner or backing web 11. This composite pressure sensitive base web and liner is jointly identified by the numeral 50 in FIG. 3. This web is directed also to the nip 35.

Accordingly, and at nip 35, the web 30 and the composite web 50 are joined to opposite sides of the barrier web 40.

It will be appreciated that the web 30 has been printed on the same apparatus at the various print stations and that the entire operation runs at a speed of approximately 200–300 feet per minute, that being the approximate speed of each of the individual webs. Accordingly, and in the operation shown in FIG. 3, the web 30 is printed on the apparatus while the composite web 50, eventually to comprise portions of the base sheets 15, are not printed.

If it is desired to print the base sheets, they can be printed on the same apparatus as shown in FIG. 3. To accomplish this, the web 30 could be printed, for example, at the first print station 31. Thereafter, the web 30 bypasses the second and third print stations 33 and 34. The elongated composite web 50 is run through the print stations 33 and/or 34 and thereafter around the barrier web to a position beneath the barrier web 40 at the nip 35.

In FIG. 3, then, the composite web 50 is shown in a position where it is not printed on the apparatus, this being for clarity and illustration in this particular explanation. It will be appreciated that it can be printed on the same apparatus as well as web 30.

A cross section of the still uncut composite web structure is shown in FIG. 6.

After running through the joining nip 35, the composite formed by the web 30, the barrier web 40 and the composite, pressure sensitive base web and backing 50, are introduced into die cutting station 60. Die cutting station 60 is operable to cut through the respective components of the apparatus, down to the carrier or liner web 11. A cross section of the still uncut composite web structure is shown in FIG. 6. In this figure, the yet uncut barrier web is inboard of the top web and base web, and adhesive layer 16 is inboard of the edge of the barrier web. The die cutting edge is diagrammatically shown to produce a cut "C" through the respective components to leave separate labels with an edge, as shown in FIG. 7.

Considering momentarily FIG. 6, then, at the die cutting station, the die apparatus is operable to cut through the top web to define a top sheet 13, the barrier web to define a barrier sheet 14, adhesive layer 17 and the base web to define a base sheet 15, but leaves intact the carrier or backing web 11. Any suitable well known die cutting operation can be utilized to provide this die cutting function.

After the individual label or coupon structures 12 are cut, the entire composite 10 is directed through a waste remnant station 65 where a matrix 66 is drawn away from the individual composite labels 12 and the backing 11. This is illustrated in FIG. 4.

Thereafter, it will be appreciated that the carrier web 11 is thereafter rolled to provide an elongated rolled label or coupon supply of indeterminate length, including a carrier web 11 and individual and separate composite label or coupon structures 12 thereon, forming the rolled label or coupon supply 70 as shown in FIG. 3. Alternately, the supply can be fan folded, or otherwise handled, however, the rolled form is most common.

In one use of the supply 70, in a coupon applying operation, for example, the rolled coupon supply 70 is delivered to an application apparatus of any known type. For example, one form of such apparatus is diagrammatically illustrated in FIG. 5. This apparatus serves to bend the backing web 11 sharply away from the coupons and then attaches the coupons to a product 20 by means of an airblast or some mechanical means which do not form part of this invention. The pressure sensitive adhesive 18 on the rear side of the respective base sheets 15 adheres the composite coupon structure to the product.

While this is only one manner in which the coupons can be applied, it should be appreciated that the composite construction of the structure 12 greatly facilitates the application of coupons to products 20 by the means illustrated in FIG. 5. When the backing web 11 is bent sharply around a corner, such as corner 71, the coupons should remain rigid so as not to bend before actually engaging the product 20. Such bending could cause folds in the coupons, misregistration, sticking of the coupon to itself, or other undesirable circumstances. Light, single ply coupons or pattern gummed coupons, for example, tend to bend or to droop in such an operation, or in the case of pattern gummed coupons tend to have an ungummed portion hit the product first. When the gummed portion immediately thereafter engages the product surface, it may do so in such a position as to cause wrinkles in the coupon. These difficulties result in poor coupon indexing and placement on the products. At the least, poor coupon control between the point of removal from the backing and the point of application to a product 20 can result. In this invention, the multiple composite construction of the coupon structure produces a relatively rigid workpiece, greatly facilitating control, placement and handling without unnecessary bending, drooping, folding, wrinkling or the like.

Returning now to FIGS. 1 and 7, it will be appreciated that in the individual cut label structure, the barrier sheet 14 is preferably of the same size as the top sheet 13 and the base sheet 15. It will also be appreciated that the adhesive layer 17 extends across the barrier sheet to that sheet's edges, but that layer 16 is short of the edge of top sheet 13 and barrier sheet 14. This facilitates later top sheet removal.

Removal of the top sheet from the barrier and base is illustrated in FIG. 7, which illustrates the top sheet 13 being removed from the barrier 14 and base sheet 15. This is greatly facilitated by non-adhered portion 13c of the top sheet which overlaps the adhesive layer 16 either at a label corner, or along the full edge of top sheet 13.

It will be appreciated, then, in the operation illustrated in FIG. 6, the top sheet 13 can be completely removed from the barrier sheet 14, base sheet 15, and the remainder of the composite structure 12. In order to insure that the barrier sheet remains with the base sheet 15, the various components of the label structure are so selected such that the adhesive between the top sheet 13 and the barrier sheet 14 permit such removal, while the adhesive layer 17 between the barrier sheet 14 and the base sheet 15 tends to stick the barrier sheet onto the base sheet 15 in a more permanent fashion.

In particular, I have discovered that when the base sheet 15 is manufactured of coated paper, it does not permit the adhesive layer 17 to soak into the base sheet, thereby leaving more adhesive 17 to secure the barrier sheet 14 to the base sheet 15. On the other hand, the paper top sheet 13 is preferably made with at least an underside, 13b, uncoated. Since that underside 13b is uncoated, the adhesive 16 tends to soak into the top sheet 13 and not as much adhesive is left between the top sheet 13 and the barrier sheet 14. Accordingly, the barrier sheet 14 tends to remain with the base sheet 15, while the top sheet 13 tends to more readily pull away from the barrier sheet 14.

Accordingly, in this preferred embodiment, the label structure 12 includes a top sheet 13 which can be printed on both upper and undersides 13a and 13b, and a base sheet 15 which, if desired, can be printed on an upper side 15a. Once the top sheet 13 is removed, the barrier sheet 14 remains secure to the base sheet 15, covering and protecting the base sheet.

Moreover, it will be appreciated that the adhesive layer 16, due to the uncoated nature of the paper of the top sheet 13, tends to remain with the top sheet 13. Where the top sheet 13 has been printed on its underside 13b with ink or other print media, and where that ink or media is still wet or uncured, it is possible that the ink or media may transfer into or coalesce with the wet adhesive layer 16. Nevertheless, since most of that adhesive is removed with the top sheet 13 when the top sheet is peeled away, the ink does not transfer to the barrier sheet 14 or to the base sheet 15. Thus, the remaining portion of the composite label structure 12 is not spoiled by ink transfer thereto from the top sheet, as it might be where the paper base sheet was not covered by the barrier which is more resistant to the sticking of the glue.

Also, it will be appreciated that as much glue as necessary can be utilized in order to maintain the register between the base sheet 15, the barrier 14 and the top sheet 14 throughout the web joining and the die cutting, waste remnant removal, and the rolling stages as shown in FIG. 3.

Of course, while the foregoing description has been directed to a composite structure having a base sheet of paper, wherein the barrier sheet is particularly effective to help block ink transfer from top sheet to base sheet, and to serve as a protective film for the base sheet once the top sheet is removed, the base sheet can be made of transparent or clear material, such as acetate.

Finally, it should be appreciated that many various types of printing combinations or graphic display can be provided by this invention. For example, both sides of the top sheet and the top side of the base, whether paper or clear, may be printed or otherwise decorated. In another example, the top sheets could be printed on one or both sides while the base sheets are clear, permitting package graphics or printing to show through, once the top sheet is removed. Alternately, a clear base sheet could be pre-printed.

In any event, the invention provides a large amount of total area for printing, including the areas over both sides of the top sheet and at least an upper side of the base, and without ink transfer or spoiling between sheets. No tabs or other top sheet parts are left on the base when the top sheet is removed.

Accordingly, it will be appreciated that the invention provides a composite label structure including a base sheet, a removable top sheet and a barrier sheet which prevents ink or print media transfer between the top sheet and the base sheet. In a preferred embodiment, the top sheet is removed from the barrier sheet and base sheet, which remain together, the barrier sheet covering and protecting the base sheet and any material printed thereon.

It will be appreciated that this label structure does not require the coupons or labels to be perforated, nor does it require any other means for tearing a portion of one sheet from another portion of the same sheet during the removal process. Also, it will be appreciated that the undesirable ink or print media transfer between the top sheet and the base sheet are prevented, and the base sheet can be made of paper or clear base materials, as described herein.

These and other modifications and advantages will be readily apparent to those of ordinary skill in the art, without departing from the scope of the invention, and applicant intends to be bound only by the claims appended hereto.

I claim:

1. A label supply in elongated form and comprising:
   an elongated carrier web of predetermined width and indeterminate length;
   a plurality of separate base sheets on said web, an upper side of said base sheet being printed with ink;
   a plurality of top sheets, respective ones of said top sheets being disposed over respective base sheets, said top sheets being printed with ink on at least an underside thereof;
   a plurality of barrier sheets, respective ones of said barrier sheets disposed between respective top and base sheets;
   first adhesive layers securing respective barrier sheets to upper sides of their respective base sheets;
   second adhesive layers removably securing respective barrier sheets to the undersides of their respective top sheets so said respective top sheets can be removed therefrom;
   said barrier sheets preventing ink transfer between said top sheets and said base sheets; and said barrier sheets remaining with said base sheets when said top sheets are removed therefrom.

2. A label supply as in claim 1, wherein said base sheet is coated paper and a side of said top sheet toward said base sheet is uncoated paper.

3. A label supply as in claim 1, wherein said top sheets have edge portions overlapping portions of said first adhesive layers, respectively.

4. A label supply as in claim 1, wherein said top, base and barrier sheets are die cut and define separate composite labels on said web.

5. A label supply as in claim 1, wherein said barrier sheet is made from a synthetic material and is print treated.

6. A label supply as in claim 5, wherein said synthetic material is selected from the group consisting of polypropylene, polyester and acetate.

7. A label supply as in claim 6, wherein said barrier sheet is clear polypropylene.

8. A label supply as in claim 1, wherein said base sheet is paper and the upper side thereof is coated, and said top sheet is paper and the underside thereof is uncoated, said ink printed on the underside of said top sheets remaining therewith when said top sheets are removed.

9. A composite label for use on a surface and having a removable portion, said label comprising:
a die cut base sheet;
adhesive means on an underside of said base sheet for securing same to a surface;
a die cut top sheet having an underside disposed over a top side of said base sheet, said underside having ink printed thereon;
a barrier sheet disposed between said base sheet and said top sheet;
a first adhesive layer securing said barrier sheet to said base sheet top side;
a second adhesive layer removably securing said top sheet underside to said barrier sheet;
said top sheet being selectively removable from said barrier sheet and base sheet, said barrier sheet remaining with said base sheet, and said ink remaining with said top sheet when it is removed.

10. A composite label as in claim 9, wherein said base sheet top side is coated paper and said top sheet underside is uncoated paper, said second adhesive layer remaining with said top sheet when said top sheet is removed, and said barrier sheet and said first adhesive layer remain with said base sheet.

11. A composite label as in claim 9, wherein said barrier sheet is made from a material selected from a group consisting of polypropylene, polyester and acetate.

12. A composite label as in claim 11, wherein said barrier sheet is print treated polypropylene.

13. A composite label as in claim 9, wherein said top side of said base sheet and said underside of said top sheet are printed with ink, said barrier sheet preventing ink transfer between said sheets.

14. A composite label as in claim 9, wherein a portion of said top sheet overlaps a portion of said first adhesive layer.

15. A label supply comprising a plurality of multiple ply printed labels wherein a top label sheet is adhered to a base sheet and is removable therefrom and comprising:
an elongated carrier web of predetermined width and indeterminate length, said carrier web comprising a release liner;
a plurality of separate base sheets on said web, an upper side of said base sheet being printed with ink;
a plurality of top sheets, respective ones of said top sheets being disposed over respective base sheets, said top sheets having a top side and an underside and being printed with ink on at least said underside;
the underside of said top sheets facing the respective upper sides of said base sheets;
a plurality of barrier sheets, respective ones of said barrier sheets disposed between respective top and base sheets;
first adhesive layers securing respective barrier sheets to their respective base sheets;
second adhesive layers removably securing respective barrier sheets to the undersides of the respective top sheets so said respective top sheets can be removed therefrom;
said second adhesive layer remaining with said top sheets when said top sheets are removed; and
said barrier sheets preventing ink transfer between said top sheets and said base sheets.

* * * * *